(No Model.)

J. S. WOOLSEY.
ROAD ENGINE.

No. 285,942. Patented Oct. 2, 1883.

Witnesses,
Geo. H. Strong.

Inventor,
J. S. Woolsey
Dewey & Co.
Attorneys

N. PETERS, Photo-Lithographer, Washington, D. C.

UNITED STATES PATENT OFFICE.

JOHN S. WOOLSEY, OF GILROY, CALIFORNIA.

ROAD-ENGINE.

SPECIFICATION forming part of Letters Patent No. 285,942, dated October 2, 1883.

Application filed July 10, 1883. (No model.)

*To all whom it may concern:*

Be it known that I, JOHN S. WOOLSEY, of Gilroy, county of Santa Clara, and State of California, have invented an Improvement in Road-Wagons; and I hereby declare the following to be a full, clear, and exact description thereof.

My invention relates to a novel steam or power road-wagon; and it consists of a pair of friction-wheels mounted upon a shaft above the bearing-wheels of the wagon, driven by the engine, and in a means for throwing them into and out of contact with the bearing-wheels, so as to drive or stop the wagon.

It also consists of certain details of construction, which will be more fully explained by reference to the accompanying drawings, in which—

Figure 1:
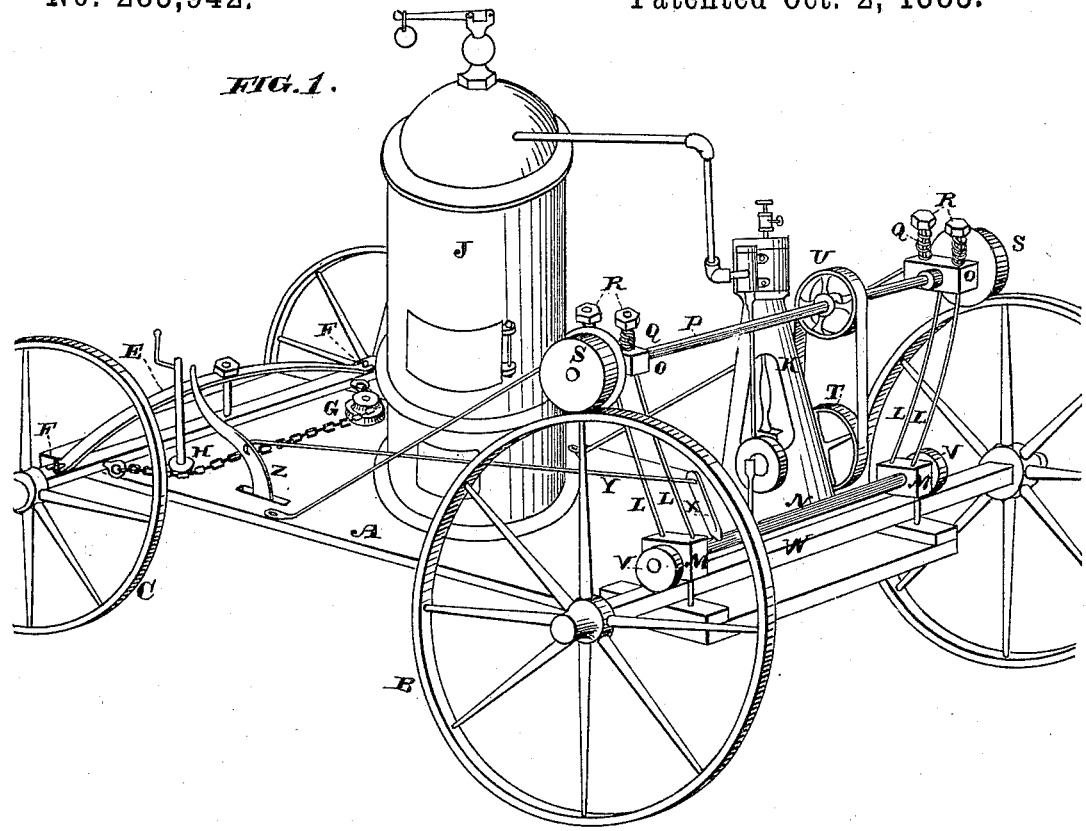
Figure 2:
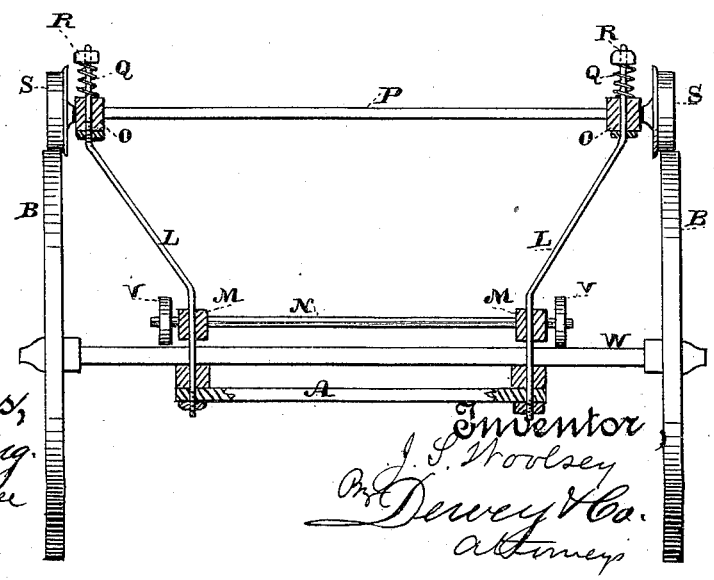

Figure 1 is a perspective view of my apparatus. Fig. 2 is a rear view, showing the bearing and friction wheels and the operating mechanism.

A is the body of my wagon. B are the rear wheels, and C are the front wheels, which are mounted upon an axle, D, and are connected with the body by a king-bolt, so as to turn and steer the wagon wherever desired. A stout arched spring, E, has its two ends slotted, so as to be guided by pins F, projecting upward from the top of the axle near its outer ends. The spring arches upward in the center, and the king-bolt passes through it, the axle, and the bed A, having a suitable plate or washer, and a nut screwed upon the lower end of the king-bolt, so that the weight of the bed or body is suspended from the arched spring, and it thus rides easily.

A horizontal pulley, G, is mounted at one side of the bed, near the front axle, and another, H, at the opposite side, having a lever, handle, or wheel by which it may be turned. A rope or chain, I, has its ends secured near the outer ends of the axle by eyebolts or otherwise, and, passing around the pulleys G and H, is secured, so as to be drawn in either direction by turning the handle or wheel of the pulley H, thus turning the front wheels and guiding the vehicle.

The boiler J and the engine K are supported upon the bed A, as shown. Strong rods L extend upward in pairs from the sides of the bed, so that each pair clasps the rear axle, and they pass through and are secured in boxes M just above the axle, in which a shaft, N, turns, for a purpose to be hereinafter described. From these boxes the rods extend upward loosely through boxes O, in which the shaft P turns, and stout springs Q surround them above the boxes upon which the springs rest. Nuts R above may be screwed down upon the rods, and by compressing the springs will give them any desired tension. As the rods slide loosely through the boxes O, it will be manifest that the body may rise and fall independent of these boxes. The shaft P, which turns in these boxes, has wheels S fixed to its outer ends, just above the rear bearing-wheels, B, and they may be flanged, as shown, if desired, to insure their proper contact with the wheels B while at work.

The engine K may be connected directly with a crank in the shaft P; or, as in the present case, a belt-pulley, T, may be fixed to the engine-shaft, and another pulley, U, to the shaft P, so that a belt extending between these pulleys serves to convey the motion of the engine to the wheels S, and through them to the wheels B.

In order to throw the wheels S into or out of contact with the wheels B, the shaft N has eccentric journals, upon which wheels V turn; or the wheels themselves may be eccentrically secured upon the shaft, with their rims resting upon the rear axle, W, as shown. A lever or arm, X, extends upward from the shaft N, and is connected by a rod, Y, with a lever, Z, near the front and within reach of the operator or steersman, so that by throwing the lever in one direction the eccentrics will be turned so as to allow the weight of the engine and wagon-body to bring the wheels S into contact with the wheels B. The wagon will thus be propelled when the engine is set in motion. By throwing the lever in the opposite direction, the larger part of the eccentrics will be brought into contact with the axle W, and will thus support the shaft P and the wheels S clear of the wheels B.

The springs Q allow the boxes of the shaft P to move upward, and the wheels S will thus accommodate themselves to any inequalities upon the rims of the wheels B, or to any stones or dirt which may adhere to them as they revolve.

It will be manifest that the mechanical construction of my apparatus may be altered without materially altering the character of my invention; but the mechanism here shown has been practically proved to work well.

Having thus described my invention, what I claim as new, and desire to secure by Letters Patent, is—

1. In a wagon or vehicle upon which an engine or motor is carried, a supplemental shaft extending across above the bearing-wheels, and having wheels fixed to it which rest upon and drive the bearing-wheels, the boxes of said shaft being connected with the vehicle-body by rods passing through them, and having springs Q and adjusting-nuts R, substantially as herein described.

2. In a wagon or vehicle upon which an engine or motor is carried, a shaft, P, turning in boxes, and having wheels S to rest upon the tops of the bearing-wheels, and rods L, passing through said boxes and upon each side of the axle to the body, where they are secured, in combination with a shaft extending through boxes above the axle and rigidly fixed to the rods L, and eccentrics or cams fixed to said shaft and bearing upon the axle, so as to raise or lower the shaft P when turned, substantially as herein described.

3. In a wagon or vehicle upon which an engine is carried, the shaft P, with its wheels S, vertically above the bearing-wheels B, rods connecting the boxes of said shaft with the vehicle-body, and the supplemental shaft N, turning in boxes fixed to the rods, and having eccentrics or cams which rest upon the axle of the bearing-wheels, in combination with a lever or means for turning the shaft N and eccentrics, so as to throw the wheels S out of or into contact with the bearing-wheels, substantially as herein described.

In witness whereof I have hereunto set my hand.

JNO. S. WOOLSEY.

Witnesses:
D. THORNTON,
WM. L. BELL.